(12) United States Patent
Grasreiner et al.

(10) Patent No.: US 11,549,457 B2
(45) Date of Patent: Jan. 10, 2023

(54) METHOD FOR DETECTING COKING IN THE INTAKE TRACT OF AN INTERNAL COMBUSTION ENGINE

(71) Applicant: Bayerische Motoren Werke Aktiengesellschaft, Munich (DE)

(72) Inventors: Sebastian Grasreiner, Graefelfing (DE); Philippe Lang, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/288,260

(22) PCT Filed: Oct. 15, 2019

(86) PCT No.: PCT/EP2019/077882
§ 371 (c)(1),
(2) Date: Apr. 23, 2021

(87) PCT Pub. No.: WO2020/083705
PCT Pub. Date: Apr. 30, 2020

(65) Prior Publication Data
US 2021/0381460 A1    Dec. 9, 2021

(30) Foreign Application Priority Data

Oct. 25, 2018    (DE) ................... 10 2018 126 693.6

(51) Int. Cl.
*F02D 41/22*    (2006.01)
*F02D 13/02*    (2006.01)
(Continued)

(52) U.S. Cl.
CPC ......... *F02D 41/22* (2013.01); *F02D 13/0223* (2013.01); *F02D 13/0226* (2013.01);
(Continued)

(58) Field of Classification Search
CPC ............ F02D 13/0223; F02D 13/0226; F02D 41/0002; F02D 41/1454; F02D 41/22; F02D 2041/001; F02D 2041/002
See application file for complete search history.

(56) References Cited

U.S. PATENT DOCUMENTS 6,892,691 B1    5/2005  Uhl et al.
7,861,515 B2 *  1/2011  Brahma ................ F02D 41/221
                                                    73/23.32
(Continued)

FOREIGN PATENT DOCUMENTS

DE    199 45 813 A1    3/2001
DE    103 39 251 A1    3/2005
(Continued)

OTHER PUBLICATIONS

Shimizu, JP 2005-023874, machine translation (Year: 2005).*
(Continued)

*Primary Examiner* — Kurt Philip Liethen
(74) *Attorney, Agent, or Firm* — Crowell & Moring LLP

(57) ABSTRACT

A method detects a fault, in particular coking, in the intake tract of an internal combustion engine with direct fuel injection, a throttle valve, and a variable intake valve lift controller. The method has the steps of a) carrying out a first quantity deviation test, by which a first air ratio value is ascertained that is formed from a lambda value, which is measured during the first quantity deviation test, and a desired lambda value of the fuel combustion in the fuel chambers of the internal combustion engine, wherein in the first quantity deviation test, a load control is carried out by the variable intake valve lift controller; b) carrying out a second quantity deviation test, by which a second air ratio value is ascertained that is formed from a lambda value, which is measured during the second quantity deviation test, and a desired lambda value of the fuel combustion in the fuel (Continued)

chambers of the internal combustion engine, wherein in the second quantity deviation test, a load control is carried out by the throttle valve; and lastly c) determining a comparison result from the first air ratio value and the second air ratio value, the presence of a fault in the intake tract of the internal combustion engine being detectable using the comparison result.

15 Claims, 1 Drawing Sheet

(51) Int. Cl.
    *F02D 41/00*     (2006.01)
    *F02D 41/14*     (2006.01)

(52) U.S. Cl.
    CPC ..... *F02D 41/0002* (2013.01); *F02D 41/1454* (2013.01); *F02D 2041/001* (2013.01); *F02D 2041/002* (2013.01)

(56) References Cited

U.S. PATENT DOCUMENTS

| | | |
|---|---|---|
| 2004/0139796 A1 | 7/2004 | Beyer et al. |
| 2005/0125139 A1 | 6/2005 | Keller et al. |
| 2011/0004394 A1 | 1/2011 | Dingl et al. |
| 2011/0137509 A1 | 6/2011 | Sarac |
| 2014/0033811 A1 | 2/2014 | Hoffmann et al. |
| 2014/0318498 A1 | 10/2014 | Rumpsa et al. |
| 2015/0136079 A1 | 5/2015 | Grasreiner |
| 2017/0184044 A1 | 6/2017 | Grasreiner |

FOREIGN PATENT DOCUMENTS

| | | | |
|---|---|---|---|
| DE | 10 2006 034 633 A1 | | 1/2008 |
| DE | 10 2008 001 099 A1 | | 10/2009 |
| DE | 10 2010 035 026 A1 | | 2/2012 |
| DE | 10 2011 005 283 B4 | | 5/2013 |
| DE | 10 2012 213 241 A1 | | 2/2014 |
| DE | 10 2014 105 270 A1 | | 10/2014 |
| DE | 103 00 592 B4 | | 12/2015 |
| DE | 102 56 906 B4 | | 10/2017 |
| DE | 10 2016 219 067 A1 | | 4/2018 |
| JP | 2005023874 A | * | 1/2005 |
| JP | 2005-214073 A | | 8/2005 |
| WO | WO 2016/041742 A1 | | 3/2016 |

OTHER PUBLICATIONS

International Search Report (PCT/ISA/210) issued in PCT Application No. PCT/EP2019/077882 dated Jan. 17, 2020 with English translation (five (5) pages).

German-language Search Report issued in German Application No. 10 2018 126 693.6 dated Aug. 14, 2019 with partial English translation (11 pages).

* cited by examiner

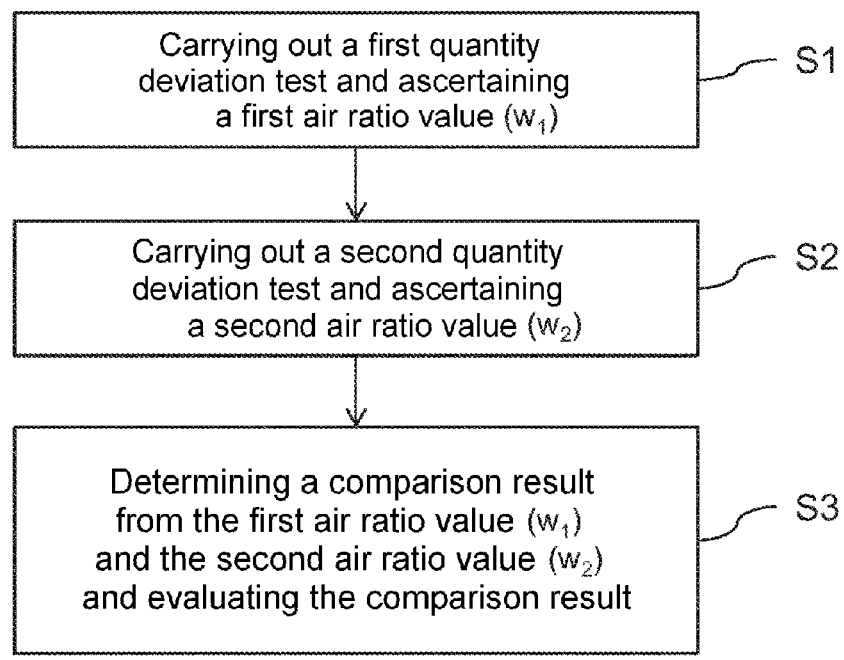

METHOD FOR DETECTING COKING IN THE INTAKE TRACT OF AN INTERNAL COMBUSTION ENGINE

BACKGROUND AND SUMMARY OF THE INVENTION

The invention relates to a method for detecting a fault in the inlet section of an internal combustion engine, and to a corresponding engine test unit. In particular, the invention relates to a method for detecting coking in the inlet section of an internal combustion engine which has direct fuel injection, a throttle flap and a variable inlet valve lift controller.

In the case of Otto-cycle engines with gasoline direct injection, coking of the inlet section can occur, in particular at the inlet valve (for example at the valve neck) or in the inlet channel at the valve opening. In the case of such coking, carbon-like material accumulates in the inlet section. A cause for the coking tendency in Otto-cycle engines with gasoline direct injection is that, in the case of Otto-cycle engines with gasoline direct injection, no continuous cleaning purging of the inlet section, for example of the inlet valve, with gasoline occurs, because the fuel is injected directly in the combustion chamber. Oil residues from the crankcase ventilation system, the valve shank seal or the turbocharging arrangement can, in conjunction with soot particles from the cylinder, accumulate in the form of carbon in the inlet under the action of heat. Here, the coking tendency tends to increase with the use of fuels and oils of low quality and in the case of low-load driving profiles.

The coking results in an impairment of the running smoothness during cold idling and can lead to increased fuel consumption and complaints with regard to warm-up driving characteristics. A coking film for example at the top on the valve neck between valve disk and valve shank can disrupt the tumbling flow, such that the idling rotational speed fluctuates to a greater degree and, in the extreme case, misfiring may even occur. A coking film may even lead, as a flow resistance, to a drop in power owing to inadequate cylinder charging. Furthermore, a coking film on the inlet valve or on the valve opening can prevent a correct closure of the valve, such that compression losses and sporadic misfiring occur.

The degree of coking in the inlet section can typically be visually established in the workshop only after a dismounting of engine parts. If the inlet section has become correspondingly coked, then the inlet section is cleaned, or the components involved are exchanged.

The visual detection of coking has the disadvantage of a large amount of working effort for the dismounting of the engine parts in order to attain visual accessibility. Furthermore, the visual examination is associated with the disadvantage of a lack of objectivity, because the coking is difficult to assess from a purely visual inspection.

The document DE 10 2012 213 241 A1 has disclosed a method which, for the detection of coking in the inlet section of an internal combustion engine with direct fuel injection, does not require dismantling of the internal combustion engine and allows an objective assessment of the coking. The method described in said document can however be used only in internal combustion engines with phase adjustment of the valve opening times (so-called variable inlet valve control), in the case of which the control of an air mass flow is performed by means of a throttle flap. In the case of this method, the internal combustion engine, when idling, is operated with an idling rotational speed which is increased in relation to normal idling operation. Furthermore, the opening time of the inlet valves is advanced by means of the variable inlet valve controller, whereby the valve overlap (the duration for which the inlet valve is opened already before the outlet valve is closed) is increased. By measurement, a running roughness characteristic variable of the internal combustion engine, which is characteristic of the running roughness of the internal combustion engine, is then determined. On the basis of the running roughness characteristic variable, it is then possible to detect the presence of coking in the inlet section.

This method however cannot be used in internal combustion engines in which the control of the air mass flow is performed by means of a variable inlet valve lift controller, because the combustion process is configured differently. Whereas, in the case of an internal combustion engine with throttling load controller, the residual gas control is performed via the inlet, it is the case in an internal combustion engine with variable inlet valve lift controller that the residual gas control is implemented via the outlet.

It is an object of the invention to provide a method for detecting a fault, in particular coking, of an internal combustion engine with direct fuel injection and variable inlet valve controller, which method requires no dismantling of the internal combustion engine for the purposes of the detection, and which method allows at least an indication of the presence of coking to be attained. Furthermore, the object is directed to specifying an engine test unit with corresponding characteristics.

This object is achieved by means of the features of the independent patent claims. Advantageous embodiments are specified in the dependent claims.

A first aspect of the invention relates to a method for detecting a fault, in particular coking, in the inlet section (intake tract) of an internal combustion engine. The internal combustion engine has one or more cylinder banks, wherein a respective cylinder bank comprises multiple cylinders with in each case one combustion chamber formed therein and at least one injection nozzle. In particular, exactly one injection nozzle is provided in each combustion chamber. A common air mass flow is fed to the combustion chambers of a respective cylinder bank. Likewise, a common exhaust-gas flow is discharged from the combustion chambers of a respective cylinder bank. The internal combustion engine has direct fuel injection, and is in particular an Otto-cycle engine with gasoline direct injection.

The method is executed for example on an engine test unit external to a vehicle, which engine test unit is used for example in a vehicle repair workshop. The engine test unit is connected to the engine controller of the vehicle wirelessly or by wires via a corresponding vehicle interface, and, via this, can control the operation of the vehicle and retrieve measured values from the engine controller. It is also conceivable for the method to be executed on the engine control unit of the vehicle, wherein, for example in the event of the detection of a fault, in particular of coking, cleaning of the inlet channels and/or of the inlet valves is instructed. For this purpose, an instruction to perform cleaning may be output to the driver or to a technician in the workshop, and/or a corresponding instruction may be stored in a fault memory of the vehicle. It is also conceivable, upon detection of a fault in the inlet section, in particular coking, to carry out automatic cleaning of the vehicle by means of the engine test unit, for example by introducing cleaning fluid into the inlet section or switching over into a cleaning operating mode of the internal combustion engine.

The internal combustion engine has a throttle flap in the inlet section and a variable inlet valve lift controller (also referred to as VVT, variable valve drive). The variable inlet valve lift controller makes it possible to regulate the valve lift. With the variable valve lift, it is possible for the quantity of air admitted into a combustion chamber of the internal combustion engine to be regulated, such that the throttle flap positioned upstream of a cylinder bank is no longer required during normal operation. The throttle flap is used only in particular operating states, for example in an emergency operating mode. By means of the throttling-free load control, charge exchange losses can be reduced. A higher inflow speed of the air leads to better mixing of the gasoline-air mixture in the combustion chamber.

In the method, in a first step, a first quantity deviation test is carried out. By means of the quantity deviation test, a first air ratio value is ascertained which is formed from a lambda value measured during the first quantity deviation test and a desired lambda value of the fuel combustion in the combustion chambers of the internal combustion engine. In the first quantity deviation test, load control of the internal combustion engine is performed by means of the variable inlet valve lift controller.

In a second step, a second quantity deviation test is carried out. By means of the second quantity deviation test, a second air ratio value is ascertained which is formed from a lambda value measured during the second quantity deviation test and a desired lambda value for the fuel combustion in the combustion chambers of the internal combustion engine. In the second quantity deviation test, load control of the internal combustion engine is performed by means of the throttle flap arranged in the inlet section.

In a third step, a comparison result is determined from the first air ratio value and the second air ratio value. It is possible to detect the presence of a fault in the inlet section of the internal combustion engine on the basis of the comparison result.

No change to the fuel path, that is to say to the delivery of the required fuel mass for the combustion, occurs while the first and the second quantity deviation test are being carried out. By contrast, by means of the different load control, on the one hand by means of the variable inlet valve lift controller and on the other hand by means of the throttle flap, the air path is changed if a fault or coking is present.

The method according to the invention makes it possible to objectively identify a fault, in particular coking, in the inlet section of an internal combustion engine with direct fuel injection. The objective identification is performed by measurement rather than by subjective visual assessment. Cleaning and/or repair is thus performed only when this is actually objectively required.

With the use of the method described herein, dismantling of the internal combustion engine solely for the visual assessment of coking is not necessary. Coking can be identified in a very short time. The duration for identifying whether a fault in the inlet section of the internal combustion engine, in particular coking, is present may lie for example within approximately ten minutes rather than one hour or more in the case of dismantling of the internal combustion engine. With the aid of the described method, it is no longer necessary for the engine to be disassembled, whereby further causes of faults for the repairs to be carried out can be minimized to those which are absolutely necessary. Furthermore, the accuracy of the detection of coking by means of a balancing mixture deviation method carried out according to the invention is considerably higher than is the case in the prior art.

The first and/or the second quantity deviation test are expediently carried out during idling operation of the internal combustion engine. The control is performed, as described above, by means of an engine test unit external to the vehicle or the engine controller of the vehicle.

The first quantity deviation test is expediently carried out with the throttle flap open and with a small or even minimal lift of the inlet valve. In other words, the first quantity deviation test is carried out in the so-called unthrottled state, in which the air quantity introduced into a combustion chamber is dependent exclusively on the magnitude of the lift of the inlet valve. Owing to a selected small or minimal lift, the air introduced into the combustion chamber will, in the presence of coking in the inlet channel or on the inlet valve, be manifest in an air quantity which is reduced in relation to the expected air quantity. Since the desired lambda value (that is to say the setpoint lambda value) deviates to a relatively great degree from the measured lambda value, this is manifest in a particular, excessively rich, first air ratio value.

By contrast, the second quantity deviation test is carried out with a maximum lift of the inlet valve and with the throttle flap substantially closed. The load control is thus performed by means of the throttle flap (so-called throttled operation). If coking is present in the inlet channel or on the inlet valve, the second air ratio value will not exhibit a deviation as great as that in the first quantity deviation test, because the cross section through which the air quantity can flow into the combustion chamber is proportionally influenced to a lesser extent by the coking than during the carrying-out of the first quantity deviation test.

The presence of a fault in the inlet section, that is to say in the air path of the internal combustion engine, can thus be inferred if the first air ratio value and the second air ratio value are different. In particular, the presence of coking in the inlet section is inferred if the first air ratio value is lower than a predefined first threshold value and the second air ratio value is higher than or equal to the predefined first threshold value.

By contrast, the presence of a leak in the inlet section can be inferred if the first air ratio value is higher than a predefined second threshold value and the second air ratio value is even further increased in relation to the predefined second threshold value. This arises from the fact that, during the first quantity deviation test, negative pressure scarcely arises when idling. A leak in the inlet section, in particular in the air manifold, thus leads to an excessively lean fuel-air mixture. The first air ratio value is thus higher than the predefined second threshold value. During the second quantity deviation test, a high negative pressure arises downstream of the throttle flap in the inlet section, in particular in the air manifold. Leakage will thus enter the inlet section or air manifold, with the effect that the fuel-air mixture is far too lean. The result is a second air ratio value which is considerably higher than the second threshold value.

The first air ratio value is formed in particular by the quotient of the lambda value measured during the first quantity deviation test and the desired lambda value. The second air ratio value is formed by the quotient of the lambda value measured during the second quantity deviation test and the desired lambda value.

By means of the preferred manner of determination of the first and of the second air ratio value, coking is present if the first air ratio value is lower than the predefined threshold value and thus lower than the second air ratio value. This arises from the fact that, during the first quantity deviation test, if coking is present, a smaller quantity of air can flow into the combustion chamber then would be the case if no coking were present. The measured lambda value is thus lower than the desired lambda value. By contrast, in the second quantity deviation test, the difference between the measured and the desired lambda value is not as great, because the coking does not cause such a great change in the air volume flowing into the combustion chamber.

The first and the second predefined threshold values are in particular equal, in particular 1.

Also proposed is a computer program product which can be loaded directly into the internal memory of a digital computer and which comprises software code segments by means of which the steps of the method described herein are carried out when the product is executed on a computer. The computer program product may be present in the form of a data carrier, for example a DVD, a CD-ROM, a USB memory stick and the like. The computer program product may also be present as a signal which can be loaded via a wireless or wired network.

A second aspect of the invention is directed to an engine test unit. The engine test unit is configured for detecting a fault, in particular coking, in the inlet section of an internal combustion engine with direct fuel injection, throttle flap and variable inlet valve controller. The unit is connectable, for example via an electrical connection or a radio connection, to the motor vehicle for the purposes of controlling the operation of the vehicle and for the purposes of receiving vehicle-internal measured values. The engine test unit controls the internal combustion engine via the engine control unit such that the above-described method is carried out.

The invention will be described below with reference to the drawing and on the basis of an exemplary embodiment.

BRIEF DESCRIPTION OF THE DRAWING

FIG. 1 is an exemplary flow diagram of a method according to the invention for detecting a fault, in particular coking, in the inlet section of an internal combustion engine.

DETAILED DESCRIPTION OF THE DRAWING

FIG. 1 shows an exemplary flow diagram of the method according to the invention for detecting coking in the inlet section of an internal combustion engine. The internal combustion engine has one or more cylinder banks, wherein a respective cylinder bank comprises multiple cylinders with in each case one combustion chamber formed therein and at least one injection nozzle. In particular, exactly one injection nozzle is provided in each combustion chamber. A common air mass flow is fed to the combustion chambers of a respective cylinder bank. Likewise, a common exhaust-gas flow is discharged from the combustion chambers of a respective cylinder bank. The internal combustion engine has direct fuel injection, and is in particular an Otto-cycle engine with gasoline direct injection and fully variable valve controller.

In step S1, a first quantity deviation test is carried out, by means of which a first air ratio value $w_1$ is ascertained. The air ratio value $w_1$ is formed from the quotient of the lambda value $\lambda_{real,\ 1}$ measured during the first quantity deviation test and the desired lambda value $\lambda_{des,\ 1}$ (that is to say the setpoint lambda value) of the fuel combustion in the combustion chambers of the internal combustion engine. In the first quantity deviation test, load control of the internal combustion engine is performed by means of a variable inlet valve lift controller (VVT).

In step S2, a second quantity deviation test is carried out, by means of which a second air ratio value $w_2$ is ascertained. The second air ratio value $w_2$ is formed from the quotient of the lambda value $\lambda_{real,\ 2}$ measured during the second quantity deviation test and the desired lambda value $\lambda_{des,\ 2}$ (that is to say a setpoint lambda value) of the fuel combustion in the combustion chambers of the internal combustion engine. In the second quantity deviation test, the load control of the internal combustion engine is performed by means of the throttle flap in the inlet section of the internal combustion engine.

In step S3, a comparison of the previously ascertained first and second air ratio values $w_1$ and $w_2$ is performed. On the basis of the comparison result, the presence of a fault, in particular the presence of coking, in the inlet section of the internal combustion engine can be inferred.

The first and the second quantity deviation test are performed in succession during idling operation of the internal combustion engine.

The first quantity deviation test carried out in step S1 is carried out with a small or minimal lift of the inlet valve, wherein the throttle flap that is arranged in the inlet section of the internal combustion engine is open. In other words, the first quantity deviation test is carried out in a conventional operating mode of an internal combustion engine which has a variable inlet valve lift controller.

By contrast the second quantity deviation test in step S2 is carried out with a maximum lift of the inlet valve (that is to say the inlet valve is open to a maximum extent) and with the throttle valve substantially closed. This operating mode corresponds to an emergency operating mode in which, in engines with a variable inlet valve lift controller, the load control is carried out by means of the throttle flap.

Characteristic first and second air ratio values $w_1$, $w_2$ arise in a manner dependent on whether a fault is present in the inlet section and in particular coking is present, wherein the ratio of said air ratio values to one another makes it possible to detect the presence of a fault in the inlet section and in particular the presence of coking.

A general fault in the inlet section can be inferred if the first air ratio value $w_1$, which was ascertained in step S1, and the second air ratio value $w_2$, which was ascertained in step S2, are different. This results from the fact that the air ratio values $w_1$, $w_2$ would have to have the same value if the lambda values $\lambda_{real,\ 1}$ and $\lambda_{real,\ 2}$ respectively measured in step S1 and S2 introduce the same air quantity into the combustion chambers with different load control, which would have to be manifest in a respectively equal measured lambda value. By contrast, if the air quantities introduced into the combustion chambers in the steps S1 and S2 differ from one another, then this leads to differences in the lambda values $\lambda_{real,\ 1}$ and $\lambda_{real,\ 2}$ measured in the steps S1 and S2, whilst the desired lambda values $\lambda_{des,\ 1}$, $\lambda_{des,\ 2}$ remain unchanged.

Coking has the effect that a carbon-like mass is deposited in the inlet, in particular in the inlet channel and/or on the inlet valve. The gradual growth of the carbon has the effect, in particular in step S1 in which the valve is only minimally open, that the air flow cross section that is otherwise present is reduced to a disproportionately great extent. As a result, a lesser air quantity can flow into the combustion chamber, whereby the measured lambda value $\lambda_{real,\ 1}$ becomes smaller. This is manifest in a decrease of the first air ratio value $w_1$. Thus, if the first air ratio value $w_1$ is lower than the second air ratio value $w_2$, then coking can be inferred. The comparison may be performed in particular in relation to a predefined threshold value, which is selected to be 1, because the respective air ratio characteristic values $w_1$, $w_2$ corresponds to the value 1 if no fault is present, because then the measured and the desired lambda value are approximately equal. The reverse situation, in which the first air ratio value $w_1$ is higher than the predefined threshold value and higher than the second air ratio value $w_2$, gives grounds for suspicion that there is a leak in the inlet section, because here, owing to the flow conditions in the second step S2, in which the internal combustion engine is operated with throttling, a smaller air quantity passes into the combustion chambers.

It is in particular expedient if the above-described check is performed on a cylinder-specific basis. For this purpose, the first air ratio value $w_1$ and the second air ratio value $w_2$ are ascertained on a cylinder-specific basis, and a comparison is likewise determined on a cylinder-specific basis. In this way, it is possible not only to make an authoritative statement regarding the presence of a fault or of coking, but even to determine the cylinder that has the fault, or demonstrate a fault intensity per cylinder.

The manner in which the measured lambda values $\lambda_{real,\,1}$ and $\lambda_{real,\,2}$ and the desired lambda values $\lambda_{des,\,1}$ and $\lambda_{des,\,2}$ are ascertained in the first step S1 and the second step S2 is well known to a person skilled in the art. One possible approach is described for example in the applicant's WO 2016/041742 A1.

Furthermore, a person skilled in the art is familiar with further approaches for the cylinder-specific determination of a measured and of a desired lambda value, such that a detailed description of the determination will not be given in the present description.

LIST OF REFERENCE DESIGNATIONS

S1 Method step
S2 Method step
S3 Method step
$\lambda_{real,\,1}$ Measured lambda value in the first quantity deviation test
$\lambda_{real,\,2}$ Measured lambda value in the second quantity deviation test
$\lambda_{des,\,1}$ Desired (setpoint) lambda value in the first quantity deviation test
$\lambda_{des,\,2}$ Desired (setpoint) lambda value in the second quantity deviation test
$w_1$ First air ratio characteristic value
$w_2$ Second air ratio characteristic value

What is claimed is:

1. A method for detecting a fault in an inlet section of an internal combustion engine with direct fuel injection, a throttle flap and a variable inlet valve lift controller, the method comprising the steps of:
    a) carrying out a first quantity deviation test by which a first air ratio value is ascertained which is formed from a lambda value measured during the first quantity deviation test and a first desired lambda value of fuel combustion in combustion chambers of the internal combustion engine, wherein, in the first quantity deviation test, load control is performed by the variable inlet valve lift controller;
    b) carrying out a second quantity deviation test by which a second air ratio value is ascertained which is formed from a lambda value measured during the second quantity deviation test and a second desired lambda value of the fuel combustion in the combustion chambers of the internal combustion engine, wherein, in the second quantity deviation test, load control is performed by the throttle flap; and
    c) determining a comparison result from the first air ratio value and the second air ratio value, wherein a presence of a fault in the inlet section of the internal combustion engine is detectable on the basis of the comparison result.

2. The method according to claim 1, wherein the fault is coking in the inlet section.

3. The method according to claim 1, wherein the first and/or the second quantity deviation test are carried out during idling operation of the internal combustion engine.

4. The method according to claim 1, wherein the first quantity deviation test is carried out with a small or minimal lift of an inlet valve controlled by the variable inlet valve lift controller and with the throttle flap open.

5. The method according to claim 4, wherein the second quantity deviation test is carried out with a maximum lift of the inlet valve and with the throttle flap substantially closed.

6. The method according to claim 1, wherein the first air ratio value and the second air ratio value are ascertained on a cylinder-specific basis, and the comparison result is determined on a cylinder-specific basis.

7. The method according to claim 1, wherein the first air ratio value is formed by the quotient of the lambda value measured during the first quantity deviation test and the first desired lambda value, and the second air ratio value is formed by the quotient of the lambda value measured during the second quantity deviation test and the second desired lambda value.

8. The method according to claim 1, wherein the presence of a fault in the inlet section is inferred if the first air ratio value and the second air ratio value are different.

9. The method according to claim 1, wherein the presence of coking in the inlet section is inferred if the first air ratio value is lower than a predefined first threshold value and the second air ratio value is higher than the predefined first threshold value.

10. The method according to claim 9, wherein the presence of a leak in the inlet section is inferred if the first air ratio value is higher than a predefined second threshold value and the second air ratio value is even further increased in relation to the predefined second threshold value.

11. The method according to claim 10, wherein the predefined first and the predefined second threshold values are equal.

12. The method according to claim 11, wherein the predefined first and the predefined second threshold values are 1.

13. The method according to claim 9, wherein the predefined first and the predefined second threshold values are equal.

14. A computer product comprising a non-transitory computer readable medium having stored thereon program code which, when executed on a processor, carries out the acts of:
    a) carrying out a first quantity deviation test by which a first air ratio value is ascertained which is formed from a lambda value measured during the first quantity deviation test and a first desired lambda value of fuel combustion in combustion chambers of the internal combustion engine, wherein, in the first quantity deviation test, load control is performed by the variable inlet valve lift controller;

b) carrying out a second quantity deviation test by which a second air ratio value is ascertained which is formed from a lambda value measured during the second quantity deviation test and a second desired lambda value of the fuel combustion in the combustion chambers of the internal combustion engine, wherein, in the second quantity deviation test, load control is performed by the throttle flap; and c) determining a comparison result from the first air ratio value and the second air ratio value, wherein a presence of a fault in an inlet section of the internal combustion engine is detectable on the basis of the comparison result.

15. An engine test unit for detecting faults in an inlet section of an internal combustion engine, which engine test unit is operatively configured to:

a) carry out a first quantity deviation test by which a first air ratio value is ascertained which is formed from a lambda value measured during the first quantity deviation test and a first desired lambda value of fuel combustion in combustion chambers of the internal combustion engine, wherein, in the first quantity deviation test, load control is performed by the variable inlet valve lift controller;

b) carry out a second quantity deviation test by which a second air ratio value is ascertained which is formed from a lambda value measured during the second quantity deviation test and a second desired lambda value of the fuel combustion in the combustion chambers of the internal combustion engine, wherein, in the second quantity deviation test, load control is performed by the throttle flap; and c) determine a comparison result from the first air ratio value and the second air ratio value, wherein a presence of a fault in the inlet section of the internal combustion engine is detectable on the basis of the comparison result.

\* \* \* \* \*